No. 798,960. PATENTED SEPT. 5, 1905.
S. GUTHMAN.
INVOICE RECORDER.
APPLICATION FILED MAR. 2, 1905.

2 SHEETS—SHEET 1.

Witnesses
C. H. Griesbauer.

Inventor
Sigmund Guthman
by H. B. Willson
Attorney

No. 798,960. PATENTED SEPT. 5, 1905.
S. GUTHMAN.
INVOICE RECORDER.
APPLICATION FILED MAR 2, 1905.

2 SHEETS—SHEET 2.

Witnesses
Inventor
Sigmund Guthman
by H. B. Willson
Attorney

UNITED STATES PATENT OFFICE.

SIGMUND GUTHMAN, OF ATLANTA, GEORGIA.

INVOICE-RECORDER.

No. 798,960.      Specification of Letters Patent.      Patented Sept. 5, 1905.

Application filed March 2, 1905. Serial No. 248,161.

*To all whom it may concern:*

Be it known that I, SIGMUND GUTHMAN, a citizen of the United States, residing at Atlanta, in the county of Fulton and State of Georgia, have invented certain new and useful Improvements in Invoice-Recorders; and I do declare the following to be a full, clear, and exact description of the invention, such as will enable others skilled in the art to which it appertains to make and use the same.

This invention relates to invoice-recorders or to means for preserving an exact copy of bills sent out and also providing an exact copy of the bill to be used as a drayman's receipt for goods delivered, the first-named copy being utilized as a day-book leaf to be filed or bound in temporary form for future reference.

The principal objects of my invention are to save the time usually occupied in copying invoices in a day-book and at the same time to secure any desired number of exact copies of the invoices for use as draymen's receipts and for filing as the leaves of a day-book. These and other objects are attained by means of the construction and arrangement illustrated in the accompanying drawings, in which—

Figure 1 is a face view of the front page of my recorder. Fig. 2 is a similar view of page 2 of the same, being of a different color from page 1 and unruled. Fig. 3 is a like view of page 3, said page having vertical rule-lines which register with the similar lines on the front page. Fig. 4 is a face view of the rear face or back of page 3. Fig. 5 is a face view of page 4, which is similar to page 2. Fig. 6 is a like view of page 5 of the recorder.

Referring to the drawings for a more particular description of the invention, the numeral 1 designates the first page or sheet of the recorder, in this instance showing two blank invoices or bill-heads 1ª. It will be understood that any suitable number of these blank invoices may be arranged on this page for either large or small orders of goods, and the blanks are divided by vertical and horizontal lines of perforations 2, leaving a plain stub or vertical strip 3 at the left-hand side of the sheet when the invoices have been detached, for a purpose which will presently appear. The usual vertical item-column 4 and the price-columns 5 are utilized in the sheet of the recorder.

Page 2 is a plain unruled sheet of paper of a contrasting color from page 1 and having the same headings 6 as said page. The word "Delivered" is used in this page instead of "Sold" in page 1. A vertical line of perforations 7 is utilized on this page in order that the prices of the goods enumerated in the original invoice may be removed from this copy, which is used as a drayman's receipt for the goods delivered to him.

Page 3 is a blank sheet of paper provided with a continuous vertical item-column 8 and similar price-columns 9. The headings 1ª and 6 on pages 1 and 2 are connected together, as will be described, to register one with the other, and the vertical columns 4 and 5 of page 1 register with the columns 8 and 9 of page 3.

Page 4 is similar in the arrangement of printed matter and of the same color as page 2, the difference being that this page is to be used when the invoice-blanks of page 1 have been utilized and detached, and the recorder is laid upon its face to use the blanks of page 5. In other words, the invoice-blanks on pages 4 and 5 are printed upon the reverse side of the sheet as compared to pages 1 and 2, the same relative arrangement being preserved in order that the item-columns will register.

Sheet 3 is ruled on both sides, so that when the recorder is reversed the copies of the invoices will be produced upon the rear face of this sheet.

The five sheets of the recorder are connected together by any suitable means, such as staples 10, and registering perforations 11 may be formed in the sheets to conform to the filing device.

The manner of using my invention may be described as follows: A sheet of carbon-paper is placed between sheets 1 and 2 and another carbon-sheet between pages 2 and 3. When the first invoice on page 1 has been made out and detached, the drayman's receipt on sheet 2 is detached for the signature of the person to whom the goods are delivered, the price-column being removed therefrom, as will be understood. When the headings of page 1 have been used, the carbon-sheets are placed between sheets 3 and 4 and between 4 and 5, and the recorder is reversed to use the headings of sheet 5. When all the headings have been detached, sheet 3 will be found to have exact copies on opposite sides of the sheet of all the invoices made out. This sheet is then numbered and placed on file for future reference. These sheets when taken for a given period form an exact day-book in which the original invoices are produced in facsimile.

The advantages residing in the use of my device are saving of time in copying, accuracy in the record, and the preservation of a facsimile of the original invoice on a day-book page.

Having thus fully described my invention, what I claim as new, and desire to secure by Letters Patent, is—

An invoice-recorder consisting of a five-sheet tablet, the two outside sheets having ruled and printed invoice-blanks thereon having the usual price-columns, intermediate sheets containing the same printed matter and each having a line of perforations to permit the removal of the price-columns therefrom, and a central blank sheet having vertical ruling upon both sides which conforms to the ruling of the invoice-blanks, and all of said sheets being secured together, so that the rulings will register, substantially as described.

In testimony whereof I have hereunto set my hand in presence of two subscribing witnesses.

SIGMUND GUTHMAN.

Witnesses:
ALBERT KAUFMANN,
DOROTHY REYNOLDS.